(12) United States Patent
Al-Otaibi

(10) Patent No.: US 9,541,337 B2
(45) Date of Patent: Jan. 10, 2017

(54) ASSEMBLY FOR PLUGGING A TUBE

(75) Inventor: Abdullah M. Al-Otaibi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 1249 days.

(21) Appl. No.: 12/947,334

(22) Filed: Nov. 16, 2010

(65) Prior Publication Data
US 2011/0240272 A1    Oct. 6, 2011

Related U.S. Application Data

(63) Continuation-in-part of application No. 12/751,252, filed on Mar. 31, 2010.

(51) Int. Cl.
F28F 7/00    (2006.01)
F28F 11/02   (2006.01)
F16L 55/132  (2006.01)

(52) U.S. Cl.
CPC ............. F28F 11/02 (2013.01); F16L 55/132 (2013.01); *Y10T 29/49908* (2015.01)

(58) Field of Classification Search
CPC ......... F28F 9/012; F28F 2220/00; F16L 55/10
USPC ............ 165/76, 79, 71; 138/89, 94; 62/298; 29/890.031; 220/233, 235; 122/364
See application file for complete search history.

(56) References Cited

U.S. PATENT DOCUMENTS

| | | |
|---|---|---|
| 1,471,157 A | 10/1923 | Gruber |
| 1,808,411 A | 6/1931 | Hlnkston |
| 2,070,780 A | 2/1937 | Boyer |
| 2,512,169 A | 6/1950 | Nachtigal |
| 3,051,200 A | 8/1962 | Bevington |
| 3,119,177 A | 1/1964 | Knecht |
| 3,680,422 A | 8/1972 | Salvador |
| 4,114,654 A * | 9/1978 | Richardson ............ 138/89 |
| 4,248,271 A | 2/1981 | Burgess |
| 4,290,543 A | 9/1981 | Larson |
| 4,436,117 A | 3/1984 | Martin |
| 4,598,738 A | 7/1986 | Weber et al. |
| 4,637,436 A | 1/1987 | Stewart, Jr. et al. |

(Continued)

FOREIGN PATENT DOCUMENTS

| | | |
|---|---|---|
| AT | 344 211 B | 7/1978 |
| DE | 185 045 C | 7/1906 |

(Continued)

OTHER PUBLICATIONS

International Search Report issued in PCT Application Serial No. PCT/US2011/030714 dated May 30, 2011. (7 pages).

(Continued)

*Primary Examiner* — Travis Ruby
(74) *Attorney, Agent, or Firm* — Bracewell LLP; Constance G. Rhebergen; Keith R. Derrington

(57) ABSTRACT

A device and method for plugging a tube that includes setting a tapered plug in a tube with a compression ring that circumscribes the plug. The ring radially expands when axially compressed and wedges the plug in the tube. An anchoring assembly fits over the tapered end of the plug and is coupled to the plug while being pushed against the compressed ring. When coupled to the plug, the anchoring assembly maintains the ring in a compressed state. The anchoring assembly can be made up of legs that fasten to the tapered end of the plug and have shoulders attached on a free end that are positioned against a lateral side of the compressed ring.

17 Claims, 4 Drawing Sheets

(56) References Cited

U.S. PATENT DOCUMENTS

| | | | |
|---|---|---|---|
| 4,723,578 A | 2/1988 | Mordarski et al. | |
| 4,751,944 A | 6/1988 | Sinha et al. | |
| 4,762,152 A | 8/1988 | Clausen | |
| 4,765,374 A | 8/1988 | Ermold et al. | |
| 4,771,810 A | 9/1988 | Ermold | |
| 4,817,671 A | 4/1989 | Mathison | |
| 4,986,313 A | 1/1991 | Mounet | |
| 5,074,336 A * | 12/1991 | Black | 138/89 |
| 5,249,604 A * | 10/1993 | Keating | 138/89 |
| 5,307,841 A | 5/1994 | Condon | |
| 5,437,310 A | 8/1995 | Cunningham | |
| 5,494,323 A | 2/1996 | Huang | |
| 5,560,394 A | 10/1996 | Jorgensen | |
| 5,797,431 A * | 8/1998 | Adams | 138/89 |
| 6,312,217 B1 | 11/2001 | Takahashi | |
| 6,378,167 B1 | 4/2002 | Howell, III et al. | |
| 6,533,134 B1 | 3/2003 | Menaged et al. | |
| 7,314,065 B1 | 1/2008 | Adelman | |
| 2004/0163818 A1 | 8/2004 | Fenton et al. | |
| 2005/0121091 A1 | 6/2005 | Sayers et al. | |
| 2006/0096736 A1 | 5/2006 | Burkhalter | |
| 2006/0112908 A1 | 6/2006 | Lieberman | |

FOREIGN PATENT DOCUMENTS

| | | |
|---|---|---|
| EP | 0120277 A1 | 10/1984 |
| EP | 1519088 A2 | 3/2005 |

OTHER PUBLICATIONS

Final Office Action for co-pending U.S. Appl. No. 12/751,252 dated Dec. 22, 2014.

Final Office Action for co-pending U.S. Appl. No. 12/751,252 dated Dec. 30, 2013.

International Search Report and Written Opinion, PCT/US2011/030647 issued May 31, 2011 (7 pages).

Office Action for co-pending U.S. Appl. No. 12/751,252 dated Jul. 18, 2014.

Office Action for co-pending U.S. Appl. No. 12/751,252 dated May 22, 2013.

* cited by examiner

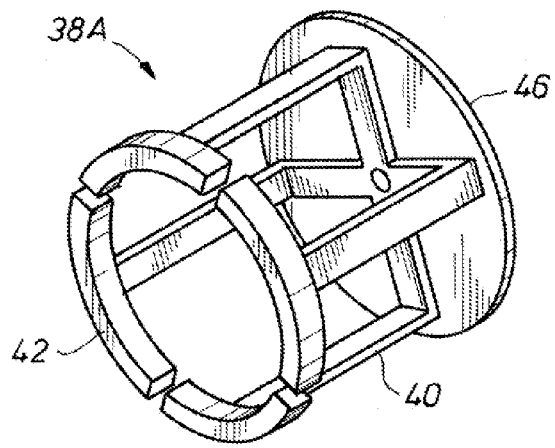
FIG. 3
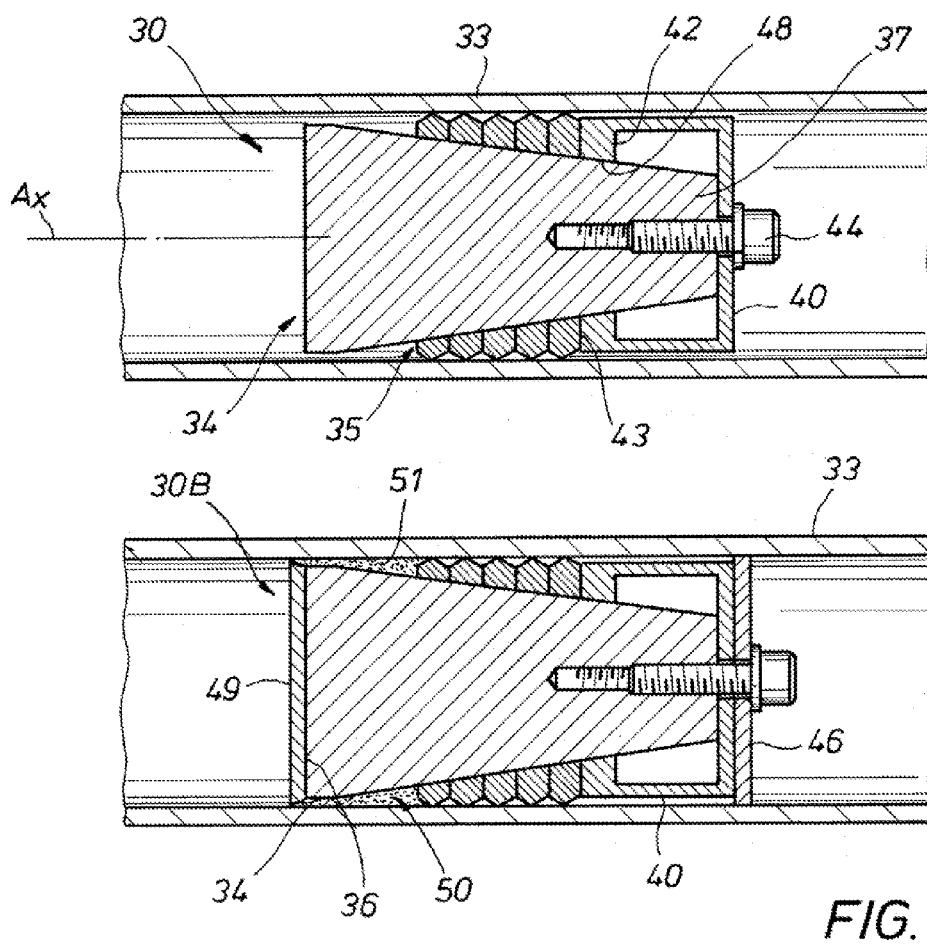
FIG. 4
FIG. 5

ASSEMBLY FOR PLUGGING A TUBE

CROSS REFERENCE TO RELATED APPLICATIONS

This application is a continuation-in-part of and claims priority from co-pending U.S. Application having Ser. No. 12/751,252, filed Mar. 31, 2010, the full disclosure of which is hereby incorporated by reference herein.

BACKGROUND OF THE INVENTION

1. Field of the Invention

The present invention relates to an apparatus for use with a fluids handing device. More specifically, the invention relates to an apparatus for plugging a fluid passage in a tube sheet.

2. Description of the Related Art

Heat exchangers for transferring heat between two different fluids typically employ multiple tubes having an inlet and an outlet both held by a tube sheet. Bores are formed through the tube sheet that register with the end of the tubes. The tubes may experience a leak along their body or where they join with the tube sheet. Corrective action may involve plugging the leaking tube at one or both ends rather than mending the leak itself. A prior art example of a plug assembly 10 is shown in a perspective and partial sectional view in FIG. 1.

In the prior art example of FIG. 1, the plug assembly 10 is set within a tube 12 to provide a pressure and flow barrier through the tube 12. The plug assembly 10 is made up of a tapered plug 14 having a blunt end and a narrow end. The body of the plug 14 narrows linearly from the blunt and narrow ends. An annular compression ring 16 surrounds a portion of the plug 14 and has an undulating outer surface along the length of the ring 16. The undulations fill a radial space between the outer surface of the plug 14 and inner surface of the tube 12. Typically, the plug 14 and an uncompressed compression ring 16 (not shown) are inserted into the tube 12, with the blunt end being inserted first. When initially inserted into the tube 12, the outer diameters of the undulations on the compression ring 16 are exceeded by the inner diameter of the tube 12, so that the plug 14 and uncompressed compression ring 16 may be inserted into the tube 12 largely unimpeded. An installation tool, not shown, having an outer sleeve is inserted into the tube 12. A force F pulls the plug 14 in the direction shown in FIG. 1 while the outer sleeve is held in place against a lateral side of the compression ring 16. The force F urges the plug 14 axially through the ring 16 and the outer sleeve retains the compression ring 16 in place. Continued pulling repositions the plug 14 within the ring 16 so that a larger diameter portion of the plug 14 is circumscribed by the compression ring 16. Continued pulling positions the ring 16 onto larger diameter portions of the plug 14, thereby increasing the force required to slide the ring 16 over the plug 14. Eventually, the resistive sliding force of the increasing diameter of the plug 14 overcomes the yield strength of the compression ring 16 and the ring 16 compresses by the combination of the pulling force F and presence of the sleeve. When axial compressed, portions of the ring 16 radially expand into spaces between the plug 14 and tube 12. The sleeve is then removed from the tube 12 along with the tool that applied the pulling force F. While the undulating peaks on the outer surface of the compression ring 16 can become deformed and provide a tight fit, over time the compression ring 16 may slide along the plug 14 towards the tapered end and introduce a risk of removing the pressure barrier provided by the plug assembly 10.

SUMMARY OF THE INVENTION

The present disclosure discloses a method and apparatus for plugging a tube. In an example embodiment a plug assembly for plugging a tube is described herein that includes a frusto-conical plug, having a portion circumscribed by an annular compression ring, that when inserted in the tube and changed into a sealing configuration, the ring radially spans between portions of the plug and an inner surface of the tube. Also included is a compression fitting made up of a leg coupled to the plug and a shoulder on a free end of the leg that is wedged against a lateral side of the compression ring. In an example, the shoulder has an elongate side disposed along an outer circumference of the plug. Also optionally included are additional legs with additional shoulders attached on a free end of the additional legs, each shoulder is wedged against a lateral side of the compression ring. In one example embodiment, the shoulders substantially circumscribe the plug and approximate a ring like element. The shoulder can have an inner radial surface that contacts an outer surface of the plug and an angular and axial profile substantially the same as an angular and axial profile of the plug. Seal members can be provided on both ends of the plug that project radially outward and into contact with an inner surface of the tube. Optionally, packing material can be put in a space between the plug and tube and between the seal members. In an example, a bolt is threadingly attached to the shoulder and a pin coupled with the bolt so that when the bolt is rotated the pin is projected from the shoulder and wedged against an inner surface of the tube. Alternatively, a slot can be formed laterally through the pin and the bolt inserts through the slot. In one alternative embodiment, threads may be provided on the bolt that engage teeth on a gear that couples to an end of the pin, and wherein the pin is threadingly engaged to the shoulder, so that by rotating the bolt, the gear and pin are rotated to then drive the pin along the threaded engagement with the shoulder.

Also disclosed herein is a heat exchanger having a tube sheet, a tube set in a bore in the tube sheet; and a plug assembly in the tube. The plug assembly in the heat exchanger can be made of a frusto conical plug that has a blunt end and a tapered end and fitted with a compression ring over a portion of the space between the plug and the tube. Also, a retainer is coupled to the plug and set on a lateral side of the compression ring facing the tapered end. In an example, the retainer comprises an elongate leg having an mounted end that is coupled to the plug and a free end attached to a shoulder that is in contact with the compression ring. The shoulder can be a curved member circumscribing a portion of the plug. Optionally, additional legs can be coupled to the plug, where each additional leg has a free end with an attached shoulder that is in contact with the compression ring. The shoulders can be positioned along a path around the plug to approximate a full circle. In an example embodiment, the retainer includes a collar set against the compression ring. Pins may be included that project radially from the retainer and into indentations on the plug; optionally, the pins may project radially from the retainer and against the tube.

Yet further disclosed herein is a method of plugging a tube. In an example embodiment, the method involves inserting into the tube a compression ring and a tapered plug circumscribed by the compression ring. A pressure barrier is formed between the plug and the tube by axially compressing the ring so it radially expands between the plug and the tube. An anchoring assembly is coupled onto the plug and in contact with a lateral side of the ring to retain the ring in an axially compressed configuration. In one example embodiment, the anchoring assembly has elongate legs each coupled to the plug and provided with a free end attached to a shoulder, where the shoulder contacts the lateral side of the compression ring. Optionally, the anchoring assembly is an annular member that is coupled to the plug and contacts the lateral side of the compression ring. The method can alternatively further include inserting a packing material into a space between the plug and the tube and providing seals on opposite ends of the plug.

BRIEF DESCRIPTION OF THE DRAWINGS

So that the manner in which the above-recited features, aspects and advantages of the invention, as well as others that will become apparent, are attained and can be understood in detail, more particular description of the invention briefly summarized above may be had by reference to the embodiments thereof that are illustrated in the drawings that form a part of this specification. It is to be noted, however, that the appended drawings illustrate only preferred embodiments of the invention and are, therefore, not to be considered limiting of the invention's scope, for the invention may admit to other equally effective embodiments.

FIG. 3 is a perspective view of a portion an alternative embodiment of the plug assembly of FIG. 2.

FIG. 4 is a side sectional view of the plug assembly of FIG. 2.

FIG. 5 is a side sectional view an alternative embodiment of the plug assembly of FIG. 2.

DETAILED DESCRIPTION OF THE EXEMPLARY EMBODIMENTS

Figure 1:
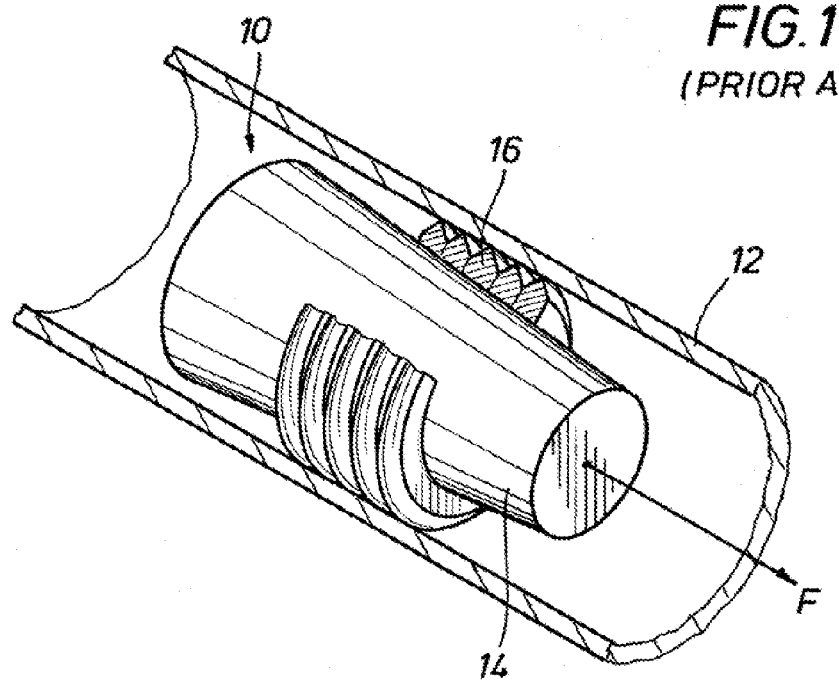
FIG. 1 is a perspective view of a prior art plug in the tube sheet of a heat exchanger.
Figure 2:
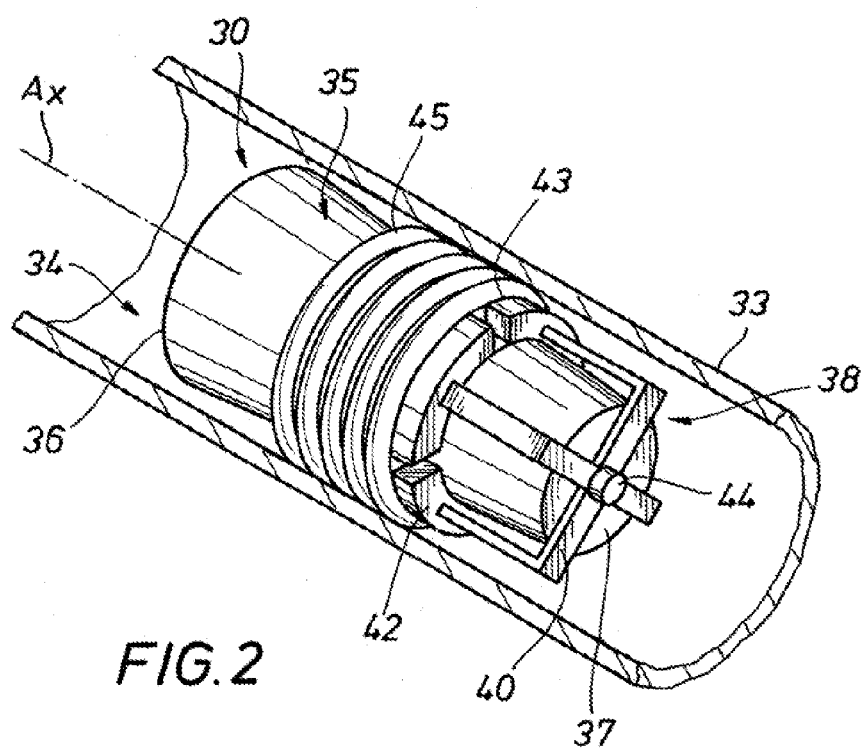
FIG. 2 is perspective view of an example of a plug assembly.

An example of a plug assembly 30 in accordance with the present disclosure is shown in a side perspective view in FIG. 2. The plug assembly 30 of FIG. 2 is shown providing a pressure barrier within a tube 33 and formed from a tapered plug 34. A portion of the tapered plug 34 is circumscribed by a compression ring 35, shown axially compressed from an insertion configuration (not shown) and into a sealing configuration. An outer circumference of the ring 35 is in contact with an inner surface of the tube 33 and an inner circumference of the ring 35 sealingly engages the tapered plug 34. The tapered plug 34 has a larger diameter or blunt end 36 and an opposing tapered end 37, outer circumference of the tapered plug 34 reduces between the blunt end 36 and tapered end 37. Although shown as a linear reduction, the diameter of the tapered plug 34 may be curved along the axis $A_X$ of the tapered plug.

Shown mounted on the tapered end 37 is a compression fitting 38 that maintains the compression ring 35 in the compressed configuration. In the example embodiment of FIG. 2, the compression fitting 38 is shown having elongate legs 40, with a segment projecting laterally along the face of the tapered end 37, and attached to another segment that extends substantially parallel with the axis $A_X$ towards the blunt end 36. The legs 40 terminate at a free end proximate an outer lateral side 43 of the compression ring 35 that faces the tapered end 37. A shoulder 42 is shown attached to each of the free ends; in the embodiment of FIG. 2 the shoulders 42 are curved members having an elongate side set against the lateral side 43 of the compression ring 35. Thus the shoulders 42 resist sliding of the lateral side 43 towards the tapered end 37. The shoulders 42 are supported in place by a fastener 44 that attaches the compression fitting 38 (and legs 40) to the tapered plug 34. The increasing circumference of the tapered plug 34 towards the blunt end 36 resists sliding of an inner lateral side 45 of the compression ring 35 from sliding towards the blunt end 36. As such, the compression ring 35 is maintained in an axially compressed state, with an expanded radius so that the compression ring 35 maintains the pressure barrier within the tube 33.

Referring now to FIG. 3, shown in a side perspective view is an example alternative embodiment of a compression fitting 38A and having a circular disk-like base 46 coupled on the segment of the legs 40 running along the surface of the tapered end 37 (FIG. 2). As will be described in more detail below, the addition of the base 46 can provide an additional sealing function and capability to the plug assembly 30.

A side sectional view of the plug assembly 30 is shown in FIG. 4 with the segment of the legs 40 that are substantially parallel with the axis $A_X$ set adjacent an inner circumference of the tube 33. However, other embodiments exist wherein the legs 40 run oblique to the axis $A_X$ and set apart from the tube 33. As further provided in FIG. 4, the shoulders 42 have an inner radial surface 48 that is angled along the axis $A_X$ and thus having a profile substantially similar to the profile of the tapered pin 34. Further illustrated in FIG. 4 is that the contact surface between the shoulder 42 and the lateral surface 43 extends along substantially the entire radial distance between the plug 34 and the tube 33. An advantage of the length of radial contact between the shoulder 42 and lateral surface 43 is that forces are better distributed between the compression fitting 38 and compression ring 35.

An alternate embodiment of the plug assembly 30B is provided in a side sectional view in FIG. 5. As discussed above, the base 46 is set coaxially with the tapered plug 34 and on the legs 40. A shroud 49 is further illustrated on a side of the plug assembly 30B opposite the base 46. The shroud 49 of FIG. 5 is an annular member that tapers radially outward with distance away from the blunt end 36 of the tapered plug 34 and has an outer circumference in sealing contact with the inner surface of the tube 33. A space 50 is defined in an area bounded by the shroud 49, base 46, plug 34, and tube 33. A packing material 51 is illustrated set within the space 50 thereby further enhancing the sealing ability of the plug assembly 30B. Examples of the packing material may be foam, elastomers, as well as metal.

Figure 6A:
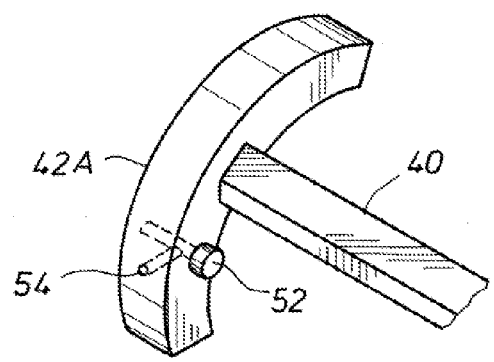
FIG. 6A is a perspective view of an alternate embodiment of a portion of the plug assembly of FIG. 2.
Figure 6B:
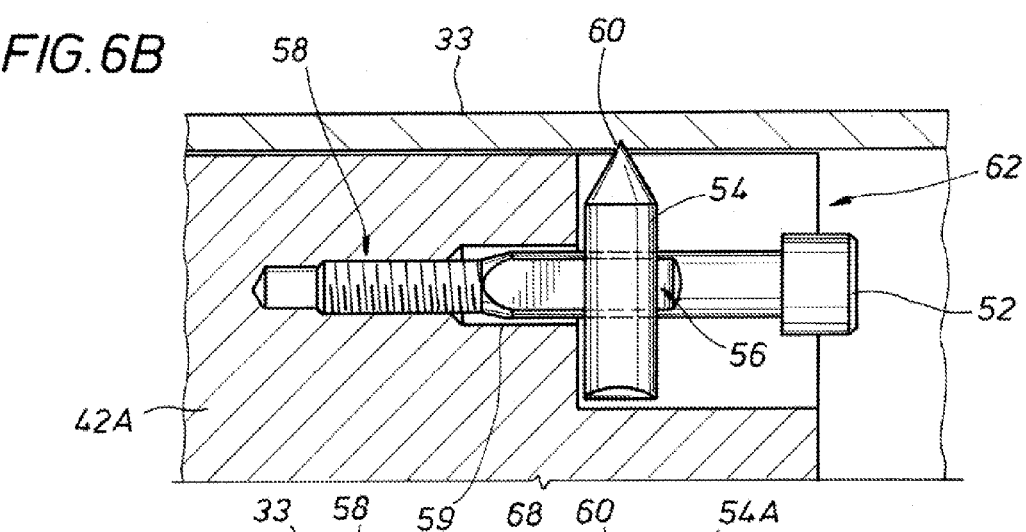
FIGS. 6B and 6C are side partial sectional views of alternate embodiments of the assembly of FIG. 6.
Figure 6C:
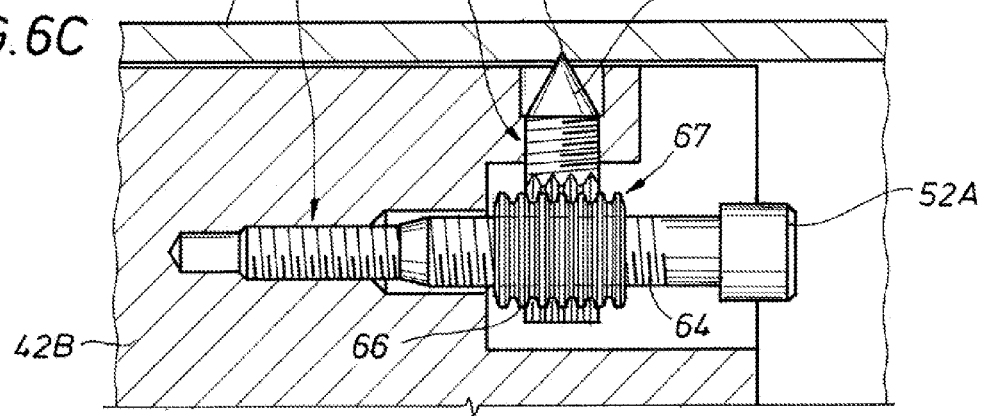

FIGS. 6A through 6C illustrate example coupling members that may be set within one or more of the shoulders for coupling the shoulder to the tube. Specifically referring to FIG. 6A, a perspective view is shown of a portion of a shoulder 42A set on the free end of a leg 40. A bolt 52 projects into the shoulder 42A from the surface facing the tapered end 37 (FIG. 2). In one example embodiment, the bolt 52 is positioned so that it is substantially aligned with the axis $A_X$ (FIG. 2). A pin 54 is also shown set within the shoulder 42A where it couples with the bolt 42. In one example of use, rotating the bolt 52 projects an outer end of the pin 54 radially outward from the shoulder 42A and into contact with the tube 33. One example embodiment of a bolt 52 and pin 54 is provided in a side partial sectional view in FIG. 6B. In this example, a slot 56 is formed transverse through the pin 54 and a shaft of the bolt 52 is inserted into the slot 56. A series of threads 58 are provided on the end of the bolt 52 that engage corresponding threads formed the lower end of a bore 59 formed within the body of the shoulder 42A. Thus, by rotating the bolt 52, an end of the pin 54 swings into contact with the tube 33A forming a notch 60 in the inner surface of the tube 33A. Interaction between the notch 60 and the pin 54 anchors the shoulder 42A to the tube 33. Further illustrated in the example of FIG. 6B, a recess 62 is formed in a surface of the shoulder 52A that allows rotation of the pin 54 therein.

Referring to FIG. 6C, an alternate example of the bolt 52A is depicted threadingly engaging an alternate example of a pin 54A. In the example of FIG. 6C, threads 64; in addition to the threads 58 on the end of the bolt 52A, are shown formed along a midsection of the shaft of the bolt 52A. The threads 64 engage teeth 66 mounted on a circular base 67; so that rotating the bolt 52A rotates the base 66. The pin 54A threadingly engages the body of the shoulder 42B, and when rotated, the pin 54A travels along the threaded connection into contact with the tube 33 to form an anchoring notch 60.

Figure 7:
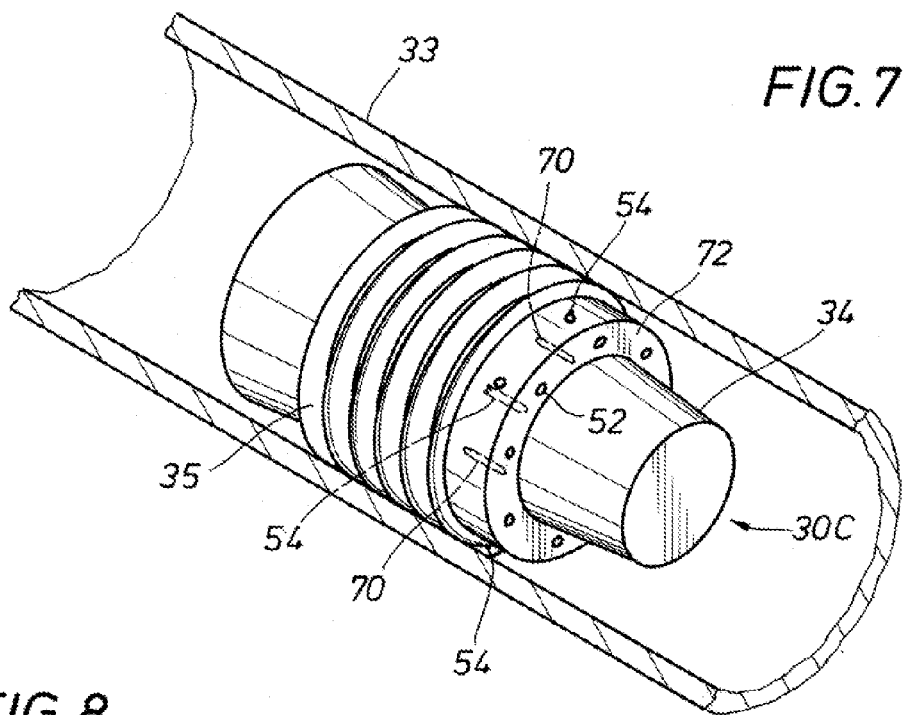
FIG. 7 is a side perspective view an alternative embodiment of the plug assembly of FIG.

An alternate example of a plug assembly 30C is illustrated in a side perspective partial sectional view in FIG. 7. In this example, the plug assembly 30C includes indentations 70 on an outer surface of the tapered plug 34A. The plug 34A is also circumscribed by the compressed ring 35. An annular anchoring ring 72 is shown set over the tapered plug 34A and circumscribing the portion of the tapered plug 34A having the indentations 70. The anchoring ring 72 further includes the bolts 52 and pins 54 substantially similar to the embodiments of FIGS. 6A through 6C. Thus, in one example, the pins 54 are provided within the anchoring ring 72 and oriented so that when activated by location of a corresponding bolt 52 and outer tip of the pins 54 can project radially inward from the anchoring ring 72 and into the tapered plug 34A. Example embodiments further exist wherein the tip of the pin 54 inserts into and engages one of the indentations 70. Additionally, pins 54 are illustrated that are oriented so that when activated by the corresponding bolt 52, the tip of the particular pin can project radially outward from the anchoring ring 72 and into contact with the tube 33. As such, the pins 54 when projected radially outward and/or inward from the anchoring ring 72 provide a coupling force between the ring 72 and tapered plug 34A, as well as a coupling force against the tube 33, thereby retaining the compression ring 35 and the compressed configuration.

Figure 8:
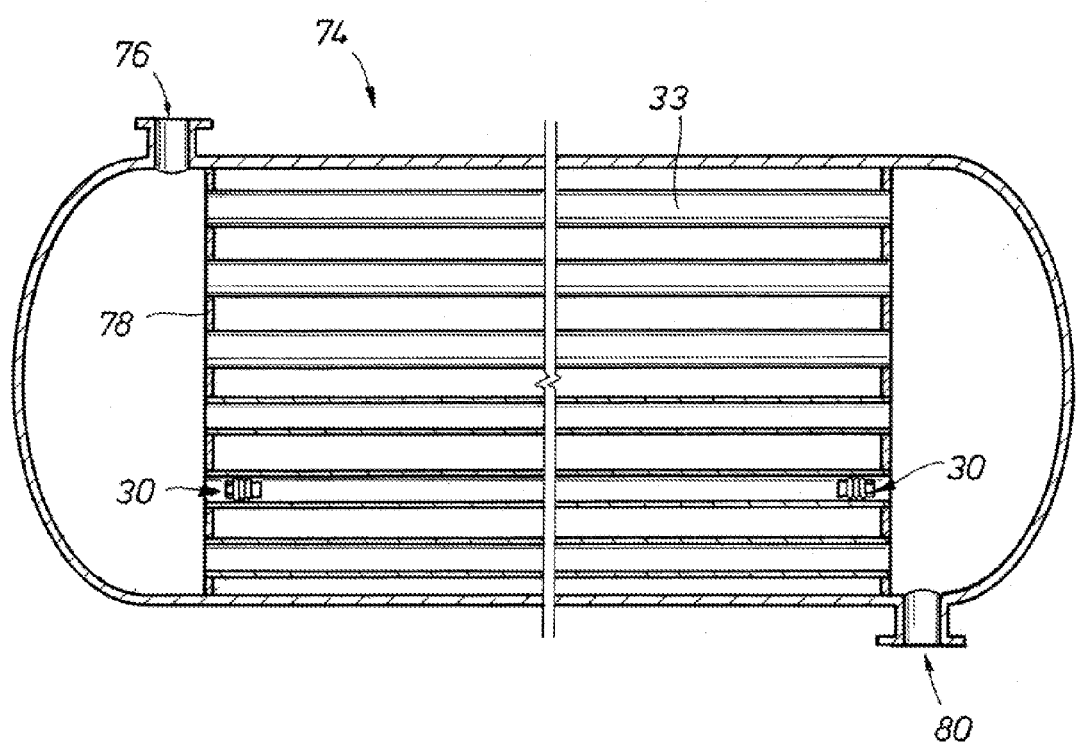
FIG. 8 is a side sectional view of an example heat exchanger having a plug assembly.

In one example of use, the plug assembly 30 can be used in a heat exchanger 74 as shown in a side sectional view in FIG. 8. In this example, the heat exchanger 74 includes a fluid inlet for allowing fluid to flow into a tube side of the heat exchanger 74. Tube sheets 78 are set within the heat exchanger 74 for retaining tubes 33 that extend between the inlet portion and exit portion. A fluid exit 80 is further provided, thereby allowing flow out of the heat exchanger 74. In the example of FIG. 8, a plug assembly 30 is shown inserted within one of the tubes 33, thereby providing a pressure and flow barrier within that tube and preventing any cross-flow along that tube 33.

Having described the invention above, various modifications of the techniques, procedures, materials, and equipment will be apparent to those skilled in the art. While various embodiments have been shown and described, various modifications and substitutions may be made thereto. For example, alternative embodiments of the bolt 44 include any type of threaded fasteners. Accordingly, it is to be understood that the present invention has been described by way of illustration(s) and not limitation. It is intended that all such variations within the scope and spirit of the invention be included within the scope of the appended claims.

What is claimed is:

1. A plug assembly for plugging a tube comprising:
   a frusto-conical plug in the tube having a blunt end and a tapered end;
   an annular compression ring circumscribing a portion of the plug and changeable into a sealing configuration that radially spans between the plug and an inner surface of the tube so that an inner radial surface of the ring is in sealing contact with an outer surface of the plug and an outer radial surface of the plug is in sealing contact with an inner surface of the tube; and
   a compression fitting comprising, a leg having an elongate first segment disposed against a terminal end of the tapered end and an elongate second segment attached to the first segment and that projects along a lateral side of the plug, a shoulder on an end of the second segment distal from the first segment, and that is wedged against a lateral side of the compression ring, a fastener coupling the first segment to the plug and that has an end that threadingly attaches to threads formed in a bore that intersects the tapered end of the plug and terminates within the plug so that a threaded end of the fastener terminates within the plug.

2. The plug assembly of claim 1, wherein the shoulder has an outer diameter less than an outer diameter of the compression ring.

3. The plug assembly of claim 1, further comprising additional legs with first and second segments, and with additional shoulders attached on ends of the second segments distal from the first segments, and, wherein each shoulder is wedged against a lateral side of the compression ring.

4. The plug assembly of claim 3, wherein the legs have elongate lengths extending axially along a length of the plug, wherein the shoulders have elongate portions projecting along a circumference of the plug and that have lengths greater than widths of the legs, and wherein the shoulders substantially circumscribe the plug and approximate a ring like element.

5. The plug assembly of claim 1, wherein the shoulder has an inner radial surface that contacts an outer surface of the plug and has an angular and axial profile substantially the same as an angular and axial profile of the plug.

6. The plug assembly of claim 1, further comprising seal members on both ends of the plug that project radially outward and into contact with an inner surface of the tube and packing material in a space between the plug and tube and between the seal members.

7. The plug assembly of claim 1, further comprising, a recess formed in the shoulder, a bolt threadingly attached to the shoulder in the recess, and a pin transversely intersected through the bolt and disposed in the recess, so that when the bolt is rotated the pin is rotated in the recess and at an angle with respect to an axis of the bolt and into wedging engagement against an inner surface of the tube that is adjacent the recess.

8. The plug assembly of claim 1, wherein the ring is an annular member and having an outer surface that is undulating along an axis of the plug.

9. The plug assembly of claim 1, further comprising a bolt threadingly attached to the shoulder and a pin transversely coupled with the bolt, wherein threads are provided on the bolt and engage teeth formed on the pin, and wherein the pin is threadingly connected to the shoulder, so that by rotating the bolt, the gear and pin are rotated to then drive the pin along the threaded engagement with the shoulder and into contact with the tube to form an anchoring notch.

10. A heat exchanger comprising:
a tube sheet,
a tube set in a bore in the tube sheet; and
a plug assembly in the tube comprising,
    a frusto conical plug having a blunt end and a tapered end,
    a compression ring that is axially compressed in a portion of the space between the plug and the tube, and that radially expands into sealing contact with the plug and the tube,
    a retainer having a portion set on a tapered end of the plug, and another portion extending along a length of the plug and in compressive engagement with a lateral side of the compression ring facing the tapered end, and
    a fastener rotatable with respect to the retainer, that couples the portion of the retainer into engaging contact with the tapered end of the plug, and that has a threaded portion that threadingly engages the tapered end of the plug when the compression ring is axially compressed.

11. The heat exchanger of claim 10, wherein the retainer comprises an elongate leg having a mounted end that is coupled to the plug and a free end attached to a shoulder that is in contact with the compression ring.

12. The heat exchanger of claim 11, wherein the shoulder comprises a curved member that circumscribes a portion of the plug.

13. The heat exchanger of claim 10, further comprising additional legs coupled to the plug and each additional leg having a free end with an attached shoulder that is in contact with the compression ring.

14. The heat exchanger of claim 13, wherein the shoulders are positioned along a path around the plug and approximate a full circle.

15. The heat exchanger of claim 10, wherein the retainer comprises a collar set adjacent the compression ring that is mounted to the plug.

16. The heat exchanger of claim 15, further comprising pins that project radially from the retainer and into indentations on an outer surface of the plug.

17. The heat exchanger of claim 15, further comprising pins that project radially from the retainer and against the tube.

* * * * *